US011768861B2

(12) United States Patent
Mehrotra et al.

(10) Patent No.: US 11,768,861 B2
(45) Date of Patent: Sep. 26, 2023

(54) HYBRID MODEL FOR DATA RECORD CLASSIFICATION

(71) Applicant: Platts (U.K.) Limited, London (GB)

(72) Inventors: Vikas Mehrotra, London (GB); Thomas Goatly, London (GB); Minesh Soni, London (GB)

(73) Assignee: Platts (U.K.) Limited, London (GB)

( * ) Notice: Subject to any disclaimer, the term of this patent is extended or adjusted under 35 U.S.C. 154(b) by 0 days.

(21) Appl. No.: 17/649,274

(22) Filed: Jan. 28, 2022

(65) Prior Publication Data

US 2023/0244698 A1    Aug. 3, 2023

(51) Int. Cl.
*G06F 16/28* (2019.01)
*G06N 5/022* (2023.01)
*G06F 16/22* (2019.01)

(52) U.S. Cl.
CPC ........ *G06F 16/285* (2019.01); *G06F 16/2264* (2019.01); *G06N 5/022* (2013.01)

(58) Field of Classification Search
CPC .. G06F 16/285; G06F 16/2264; G06F 16/283; G06F 30/27; G06F 16/22; G06N 5/022; G06N 20/00; G06N 3/08

USPC ......................................................... 707/739
See application file for complete search history.

(56) References Cited

U.S. PATENT DOCUMENTS

| | | | |
|---|---|---|---|
| 2008/0208838 A1* | 8/2008 | Friedlander | G06F 16/24565 707/999.005 |
| 2018/0268080 A1* | 9/2018 | Christian | G06F 16/90335 |
| 2018/0308112 A1* | 10/2018 | Prentice | G06Q 30/0202 |
| 2019/0378066 A1* | 12/2019 | Zhu | G06Q 10/0633 |
| 2022/0058169 A1* | 2/2022 | Amzal | G06F 18/2148 |

* cited by examiner

*Primary Examiner* — Evan Aspinwall
(74) *Attorney, Agent, or Firm* — Yee & Associates, P.C.

(57) ABSTRACT

A method, apparatus, system, and computer program code for classifying data. A number of virtual datasets is generated at multiple granularities across a number of data dimensions. Data records that correspond to a combination of data dimensions are identified in a virtual dataset. A number of defined rules are applied to: determine a set of granularities for each of the number data dimensions for comparing the data records that were identified; and determine a model for comparing the data records that were identified. The data records are classified according to the model and the set of granularities that were determined for the number data dimensions.

21 Claims, 10 Drawing Sheets

HYBRID MODEL FOR DATA RECORD CLASSIFICATION

BACKGROUND

1. Field

The disclosure relates generally to an improved computer system and, more specifically, to a method, apparatus, computer system, and computer program product for classifying data records

2. Description of the Related Art

Machine learning involves using machine learning algorithms to build machine learning models based on samples of data. The samples of data used for training referred to as training data or training datasets. Machine learning models trained using training datasets and make predictions without being explicitly programmed to make these predictions. Machine learning models can be trained for a number of different types of applications. These applications include, for example, medicine, healthcare, speech recognition, computer vision, or other types of applications.

These machine learning algorithms can include supervised machine learning algorithms and unsupervised machine learning algorithms. Supervised machine learning can train machine learning models using data containing both the inputs and desired outputs.

SUMMARY

According to one embodiment of the present invention, a method provides for classifying data records. The method includes the steps of: generating a number of virtual datasets at multiple granularities across a number data dimensions; identifying data records in a virtual dataset that corresponds to a combination of data dimensions; applying a number of defined rules to: determine a set of granularities for each of the number data dimensions for comparing the data records that were identified; and determine a model for comparing the data records that were identified; and classifying the data records according to the model and the set of granularities that were determined for the number data dimensions.

According to another embodiment of the present invention, a computer system comprises a hardware processor, and a classifier, in communication with the hardware processor. The classifier is configured to execute program code for: generating a number of virtual datasets at multiple granularities across a number data dimensions; identifying data records in a virtual dataset that corresponds to a combination of data dimensions; applying a number of defined rules to: determine a set of granularities for each of the number data dimensions for comparing the data records that were identified; and determine a model for comparing the data records that were identified; and classifying the data records according to the model and the set of granularities that were determined for the number data dimensions.

According to yet another embodiment of the present invention, a computer program product comprises a computer-readable storage media with program code stored on the computer-readable storage media for classifying data records. The program code is executable by a computer system to perform a method of: generating a number of virtual datasets at multiple granularities across a number data dimensions; identifying data records in a virtual dataset that corresponds to a combination of data dimensions; applying a number of defined rules to: determine a set of granularities for each of the number data dimensions for comparing the data records that were identified; and determine a model for comparing the data records that were identified; and classifying the data records according to the model and the set of granularities that were determined for the number data dimensions.

DETAILED DESCRIPTION

Figure 1:
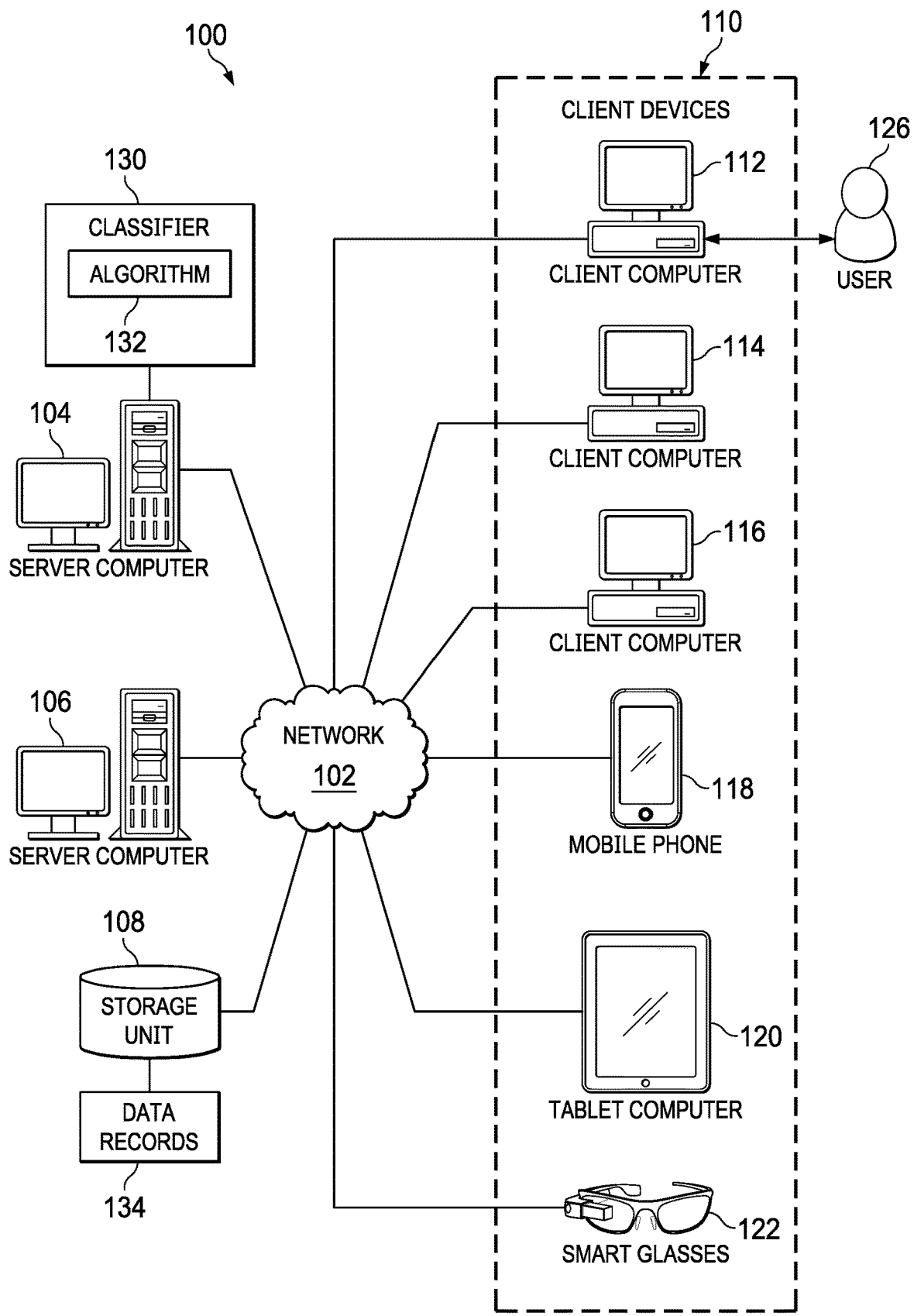
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage media and downloaded to a data processing system or other device for use. For example, the program code can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, a "number of," when used with reference to items, means one or more items. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In the illustrative example, user 126 operates client computer 112. User 124 can request classification of data records 134. In the illustrative example, classifier 130 can classify data records 134 in response to receiving user input from user 124.

In this illustrative example, classifier 130 can run on server computer 104. In another illustrative example, classifier 130 can be run in a remote location such as on client computer 114 and can take the form of a system instance of the application. In yet other illustrative examples, classifier 130 can be distributed in multiple locations within network data processing system 100. For example, classifier 130 can run on client computer 112 and on client computer 114 or on client computer 112 and server computer 104 depending on the particular implementation.

Classifier 130 can operate to perform data classification using a hybridized model to derive information based on a hierarchy of known data dimensions. Classifier 130 uses an algorithm 132 built from an analysis of patterns among the data dimensions in a dataset, algorithm 132 and marries this pattern analysis with mathematical probabilistic models, enabling classifier 130 to perform classification of data records more accurately.

Figure 2:
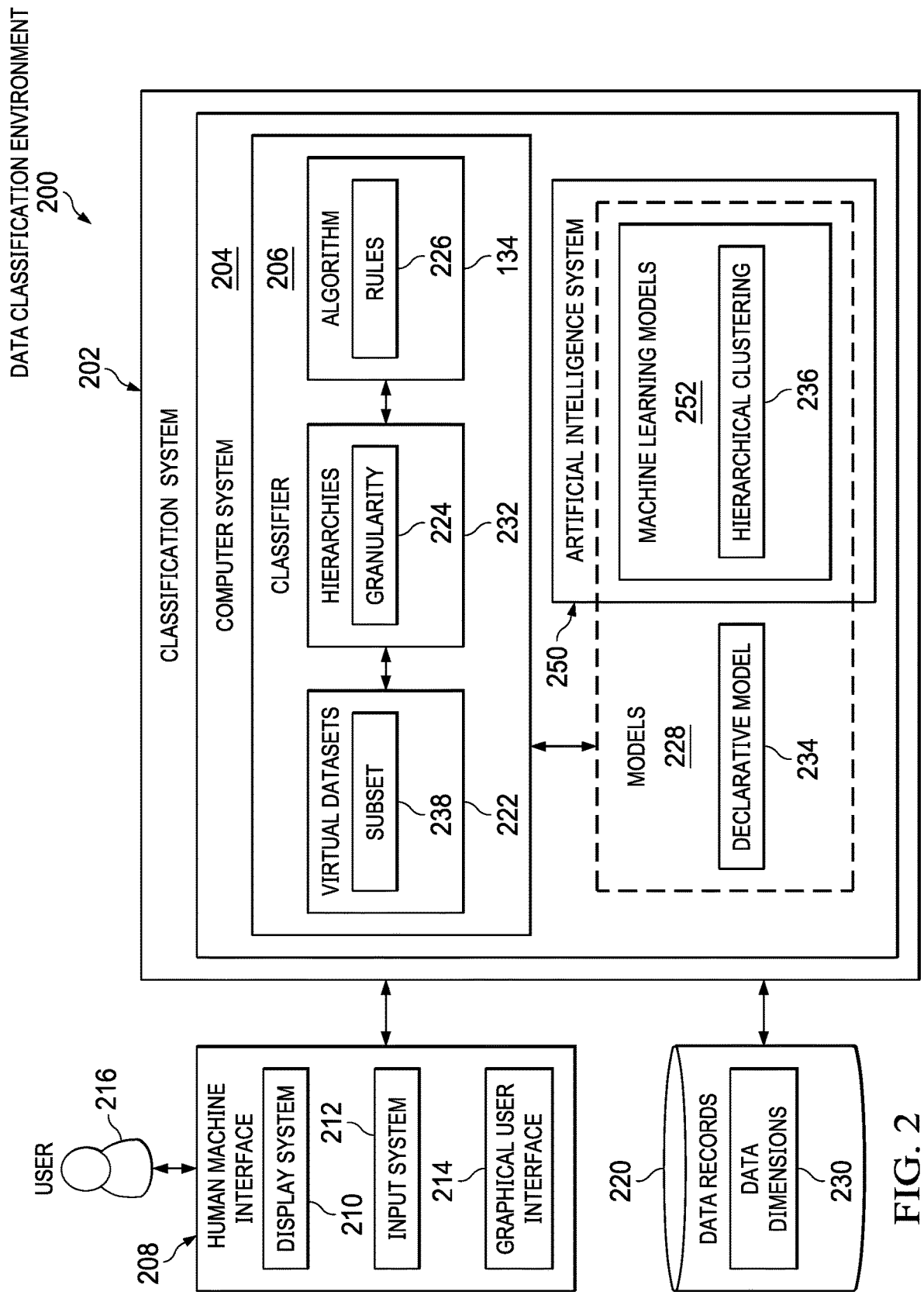
FIG. 2 is a block diagram of a data classification environment depicted in accordance with an illustrative embodiment.

With reference now to FIG. 2, a block diagram of a data classification environment is depicted in accordance with an illustrative embodiment. In this illustrative example, data classification environment 200 includes components that can be implemented in hardware such as the hardware shown in network data processing system 100 in FIG. 1.

In this illustrative example, classification system 202 in data classification environment 200 can classify data records using a hybridized model that derives information in data records based on a hierarchy of known data dimensions.

As depicted, classification system 202 comprises computer system 204 and classifier 206. Classifier 206 runs in computer system 204. Classifier 206 can be implemented in software, hardware, firmware, or a combination thereof. When software is used, the operations performed by classifier 206 can be implemented in program code configured to run on hardware, such as a processor unit. When firmware is used, the operations performed by classifier 206 can be implemented in program code and data and stored in persistent memory to run on a processor unit. When hardware is employed, the hardware may include circuits that operate to perform the operations in classifier 206.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, human machine interface 208 comprises display system 210 and input system 212. Display system 210 is a physical hardware system and includes one or more display devices on which graphical user interface 214 can be displayed. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information.

User 216 is a person that can interact with graphical user interface 214 through user input generated by input system 212 for computer system 204. Input system 212 is a physical hardware system and can be selected from at least one of a mouse, a keyboard, a trackball, a touchscreen, a stylus, a motion sensing input device, a gesture detection device, a cyber glove, or some other suitable type of input device.

In this illustrative example, human machine interface 208 can enable user 216 to interact with one or more computers or other types of computing devices in computer system 204. For example, these computing devices can be client devices such as client devices 110 in FIG. 1.

In this illustrative example, classifier 206 in computer system 204 is configured to classify data records 220. Classifier 206 generates a number of virtual datasets 222 at multiple granularities 224 across a number of data dimensions 230. Virtual datasets are abstractions, built on top of data records 220 found in the immutable physical dataset sources. Conceptually, virtual datasets 222 are a layered stack of data transformations that have been performed on data records 220. Each of virtual datasets 222 can be ultimately described by a SQL query.

In this illustrative example, classifier 206 identifying data records 220 in virtual datasets 222 that corresponds to a combination of data dimensions 230. Classifier 206 then applies a set of rules 226 to determine both a model for comparing data records 220, and a granularity at which data records 220 are to be compared.

In this illustrative example, classifier 206 can apply a number of defined rules 226 to determine a set of granularities 224 for each of the number data dimensions 230 for comparing the data records 220 that were identified. Classifier 206 can apply a number of defined rules 226 to determine a one of models 228 for comparing the data records 220 that were identified. Based on the identified one of models 228 and the set of granularities 224 that were determined for the number data dimensions 230, classifier 206 classifies the data records 220.

In one illustrative example, to determine a comparable granularity of data dimensions, classifier 206 identifies a first set of data records 220 that correspond to the multiple granularities 224 in a first one of hierarchies 232 of data dimensions 230, and a second set of data records 220 that correspond to the multiple granularities 224 in a second one of hierarchies 232 of data dimensions 230. For each combination of granularities 224 across the first one of hierarchies 232 and the second one of hierarchies 232, classifier 206 generates one of virtual datasets 222 from a corresponding subset 238 of the data records 220.

In one illustrative example, to determine a comparable dimension within a first one of hierarchies 232, classifier 206 determines granularities 224 for comparing data records 220 across multiple hierarchies of data dimensions 230. For example, starting with a most granular virtual dataset, classifier 206 determines whether the virtual dataset contains the data records 220. In response to determining that the virtual dataset does not contain the data records 220, classifier 206 the virtual dataset into a second virtual dataset that corresponds to a lower granularity for the first one of hierarchies 232 but not for the second one of hierarchies 232.

Continuing with the current example, to determine a comparable dimension within a second one of hierarchies 232, classifier 206 determines whether the data records 220 of virtual datasets 222 uniquely correspond to a particular one of the granularities 224 in the second one of hierarchies 232. The virtual dataset can be the one of virtual datasets 222 that was identified for comparing data dimensions 230 according to the first one of hierarchies 232. In response to determining that the virtual dataset does not uniquely correspond to the particular one, the classifier rolls the virtual dataset into a second virtual dataset that corresponds to a lower granularity for the second one of hierarchies 232 but not for the first one of hierarchies 232.

In one illustrative example, the identified one of models 228 is a declarative model 234 that maps a specific combination of combination of granularities 224 across the first one of hierarchies 232 and the second one of hierarchies 232 to a and additional data dimension that can be used for classifying the data record. For example, if classifier 206 determines that the virtual dataset uniquely corresponds to the particular one of the granularities 224 in the second one of hierarchies 232, classifier 206 selecting a declarative model that generates additional data dimensions 230 for the data records 220 according to the granularity that was determined. Classifier 206 then classifies the data records 220 according to the additional data dimensions 230 that were declaratively generated.

In some illustrative examples, classifier 206 can use artificial intelligence system 250. Artificial intelligence system 250 is a system that has intelligent behavior and can be based on the function of a human brain. An artificial intelligence system comprises at least one of an artificial neural network, a cognitive system, a Bayesian network, a fuzzy logic, an expert system, a natural language system, or some other suitable system. Machine learning is used to train the artificial intelligence system. Machine learning involves inputting data to the process and allowing the process to adjust and improve the function of the artificial intelligence system.

In this illustrative example, artificial intelligence system 250 can include a set of machine learning models 252. A machine learning model is a type of artificial intelligence model that can learn without being explicitly programmed. A machine learning model can learn based on training data input into the machine learning model. The machine learning model can learn using various types of machine learning algorithms. The machine learning algorithms include at least one of a supervised learning, an unsupervised learning, a feature learning, a sparse dictionary learning, and anomaly detection, association rules, or other types of learning algorithms. Examples of machine learning models include an artificial neural network, a decision tree, a support vector machine, a Bayesian network, a genetic algorithm, and other types of models. These machine learning models can be trained using data and process additional data to provide a desired output.

In one illustrative example, the identified one of models 228 is a machine learning model that classifies data records 220 according to probabilistic relationships among the different data dimensions 230. For example, if classifier 206 determines that the virtual dataset does not uniquely correspond to the particular one of the granularities 224 in the second one of hierarchies 232, classifier 206 selects machine learning model that generates additional data dimensions 230 for the data records 220 according to the number data dimensions 230 of the data records 220 that were identified. Classifier 206 then classifies the data records 220 according to the additional data dimensions 230 that were predictively generated.

In one illustrative example, machine learning models 252 comprises a set of hierarchical clustering models 236. Hierarchical clustering is a method of cluster analysis which seeks to build a hierarchy of clusters.

Hierarchical clustering models 236 can include one or more agglomerative models that merge pairs of clusters (starting from individual observations) in a greedy manner as the hierarchy is traversed to lesser level of granularities 224. Hierarchical clustering models can include one or more divisive models that recursively split pairs of clusters in a greedy manner as the hierarchy is traversed to a greater level of granularities 224. The results of hierarchical clustering can be presented in a dendrogram.

In order to decide which clusters should be combined (for agglomerative), or where a cluster should be split (for divisive), a measure of dissimilarity between sets of observations is required. In most methods of hierarchical clustering, this is achieved by use of an appropriate metric (a measure of distance between pairs of observations), and a linkage criterion which specifies the dissimilarity of sets as a function of the pairwise distances of observations in the sets.

The choice of an appropriate metric will influence the shape of the clusters, as some elements may be relatively closer to one another under one metric than another. For example, the metric can be determined any appropriate distance metric, including, but not limited to:

A Euclidean distance:

$$\|a-b\|_2 = \sqrt{\sum_i (a_i - b_i)^2}$$

A squared Euclidean distance:

$$\|a-b\|_2^2 = \sum_i (a_i - b_i)^2$$

A Manhattan distance:

$$\|a-b\|_1 = \sum_i |a_i - b_i|$$

A Chebyshev distance:

$$\|a-b\|_\infty = \max_i |a_i - b_i|$$

The linkage criterion determines the distance between sets of observations as a function of the pairwise distances between observations. Hierarchical cluster analysis of n objects is defined by a stepwise algorithm which merges two objects at each step, the two which have the least dissimilarity. Dissimilarities between clusters of objects can be defined by any appropriate linkage criteria that link two sets of observations A and B, including, but not limited to:

A maximum dissimilarity (complete linkage), $$D(a,b)=\max\{d(a,b): a \in A, b \in B\}$$

A minimum dissimilarity (single linkage)

$$D(a,b)=\min\{d(a,b): a \in A, b \in B\}$$

An unweighted average dissimilarity $$D(a, b) = \frac{1}{|A| \cdot |B|} \sum_{a \in A} \sum_{b \in B} d(a, b)$$

A weighted average dissimilarity $$D(i \cup j, k) = \frac{d(i, k) + d(j, k)}{2}$$

A centroid linkage clustering $$D(a,b)=\|c_a - c_b\|$$

A Minimum Energy Clustering $$D(a, b) = \frac{2}{nm} \sum_{i,j=1}^{n,m} \|a_i - b_j\|_2 - \frac{1}{n^2} \sum_{i,j=1}^{n} \|a_i - a_j\|_2 - \frac{1}{m^2} \sum_{i,j=1}^{m} \|b_i - b_j\|_2$$

wherein d is the chosen metric.

Using an appropriate dissimilarity measure, different data dimensions 230, such as either rows or columns of a matrix, can be clustered. The result of a cluster analysis is a binary tree, or dendrogram. Granularities 224 are defined by cutting branches of the tree at height determined by the distance metric, and by validating the chosen number of clusters using a permutation test.

In one illustrative example, the model is a machine learning model that classifies data records 220 according to probabilistic relationships among the different data dimensions 230. For example, if classifier 206 determines that the virtual dataset does not uniquely correspond to the particular one of the granularities 224 in the second one of hierarchies 232, classifier 206 selects machine learning model that generates additional data dimensions 230 for the data records 220 according to the number data dimensions 230 of the data records 220 that were identified. Classifier 206 then classifies the data records 220 according to the additional data dimensions 230 that were predictively generated.

In one illustrative example, the machine learning model is a hierarchical clustering model that is trained from a training dataset of data records 220. Classifier 206 then classifies the data records 220 by determining a most similar cluster for the data records 220 at the granularity that was determined for the number data dimensions 230. Classifier 206 then classifies the data records 220 according to the hierarchical clustering model at the set of granularities 224 that was determined for the number data dimensions 230.

Computer system 204 can be configured to perform at least one of the steps, operations, or actions described in the different illustrative examples using software, hardware, firmware, or a combination thereof. As a result, computer system 204 operates as a special purpose computer system in classifier 206 in computer system 204. In particular, classifier 206 transforms computer system 204 into a special purpose computer system as compared to currently available general computer systems that do not have classifier 206.

The illustration of data classification environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
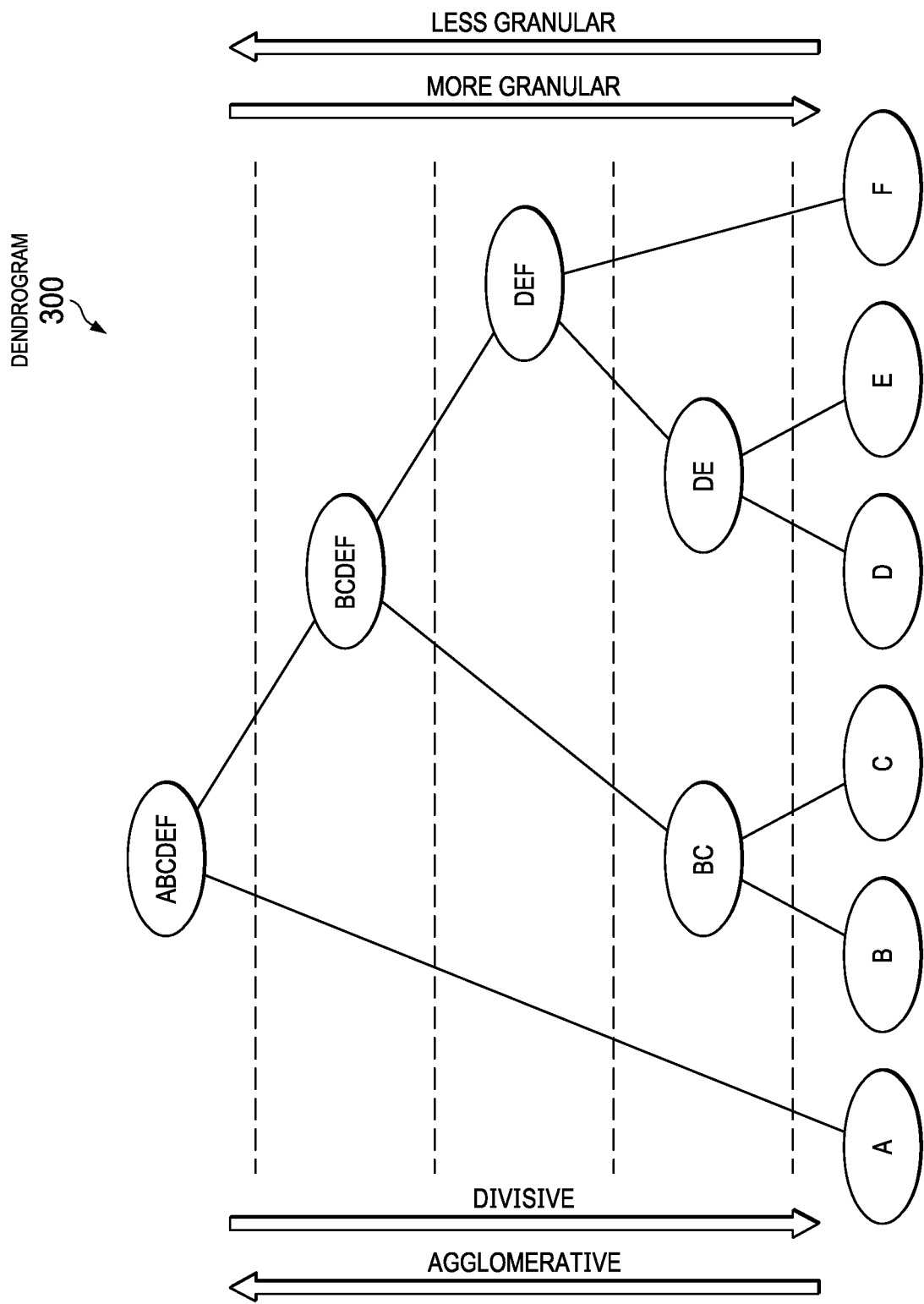
FIG. 3 is a dendrogram showing a hierarchical clustering of data records depicted in accordance with an illustrative embodiment.

With reference to FIG. 3, a dendrogram showing a hierarchical clustering of data records is depicted in accordance with an illustrative embodiment.

Hierarchical clustering models can include one or more agglomerative models that merge pairs of clusters (starting from individual observations) in a greedy manner as the hierarchy is traversed to lesser granularities. Hierarchical clustering models can include one or more divisive models that recursively split pairs of clusters in a greedy manner as the hierarchy is traversed to greater granularities. The results of hierarchical clustering can be presented in a dendrogram, such as dendrogram 300.

Agglomerative models build the hierarchy from the individual elements by progressively merging clusters. As depicted, dendrogram 300 includes six elements {a} {b} {c} {d} {e} and {f}. The first step is to determine which elements to merge in a cluster. Usually, this is the two closest elements, according to the chosen distance metric.

Divisive models build the hierarchy in the top-down approach by progressively dividing a larger cluster down to the single elements. Starting from a single cluster, elements by progressively merging clusters. As depicted, dendrogram 300 six elements {a} {b} {c} {d} {e} and {f}. The first step is to determine which elements to split into separate clusters. Usually, this is the two farthest elements, according to the chosen distance metric.

Cutting dendrogram 300 at a given height will give a partitioning clustering at a selected granularity. In this example, cutting after the second row (from the top) of will yield clusters {a} {b c} {d e} {f}. Cutting after the third row will yield clusters {a} {b c} {d e f}, which is a less granular clustering, with a smaller number of larger clusters. A distance matrix can optionally be constructed this stage, where the number in the i-th row j-th column is the distance between the i-th and j-th elements. Then, as clustering progresses, rows and columns are merged (or split) as the clusters are merged (or split) and the distances updated.

Figure 4:
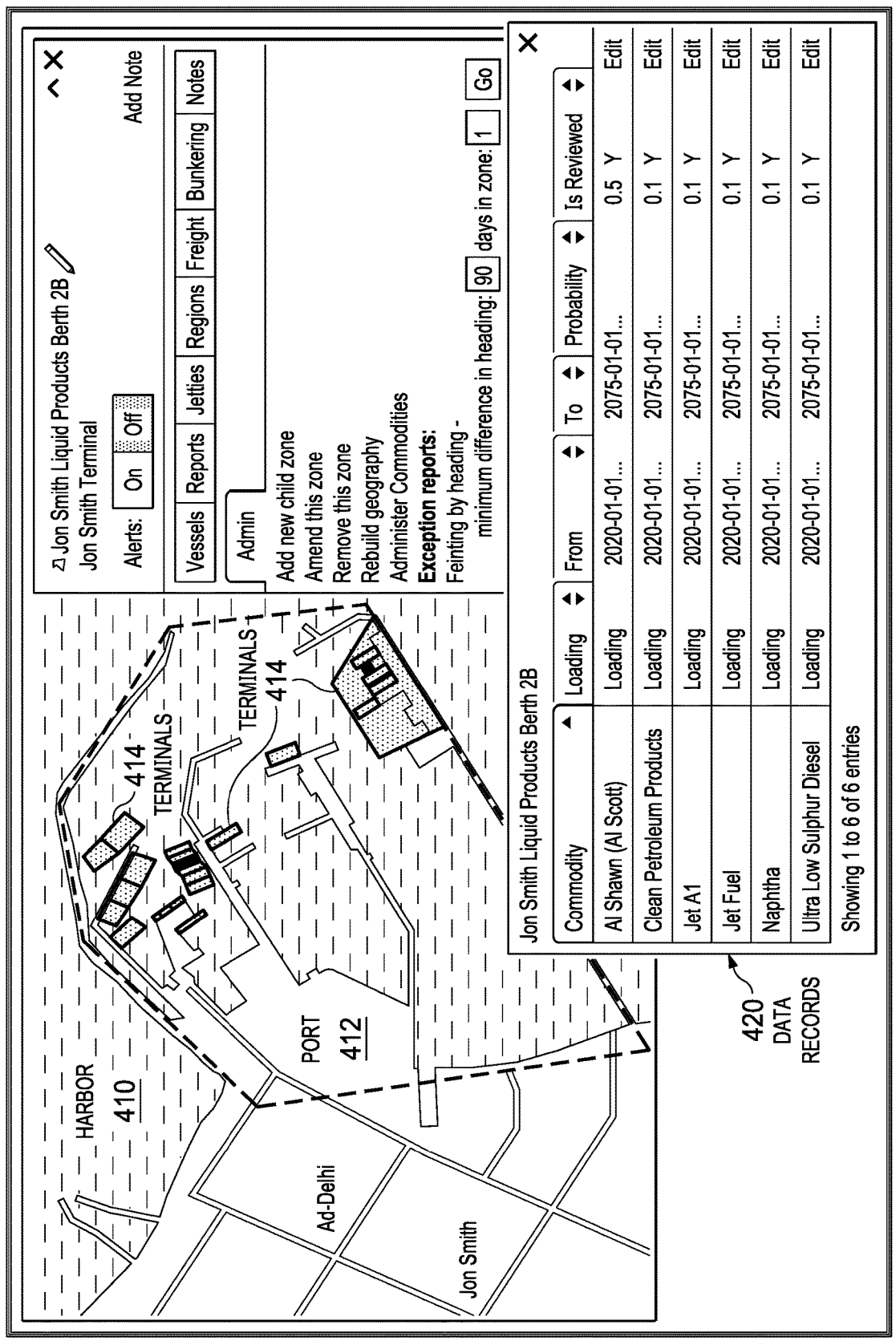
FIG. 4 is a classification environment for a particular use case of the classifier as applied to a determination of shipping commodities depicted in accordance with an illustrative embodiment.

Turning now to FIG. 4, a classification environment for a particular use case of the classifier as applied to a determination of shipping commodities is depicted in accordance with an illustrative embodiment.

Information regarding shipping traffic to and from various ports is typically gathered by port authorities and may be publicly available, however such information is often limited in geographic scope. Maritime fleet managers may receive reports of ship positions and collect information regarding the disposition of their own ships and their respective cargos. However, this information is not largely publicly available and generally pertains only to specific vessels and is not associated with other data. Further, data that incorporates these variables for accurately predicting worldwide flow of certain commodities involving virtually all shipping of those commodities around the world is not presently accessible to the interested parties such as traders of the subject commodities or economists interested in global economic trends. These interested parties are currently forced to rely on anecdotal, untimely, spotty reports, and incomplete modeling for the datasets they require.

The illustrative embodiments herein enable enables a daily, transparent Commodity Flow analysis for the waterborne movements of commodities by volume around the world. Along with port callings, a record of various other historic data on vessels is maintained including their reported draught. By employing the illustrative embodiments to this dataset, informed views, and projections of currently moving commodities between supply and demand centers can be generated, enabling users to identify and take advantage of potential shifts in global commodity markets.

The illustrative embodiments organize may be used to organize port characteristics at multiple granularities of a hierarchy, enabling a more accurate analysis of commodity movements around the world. For example, as tankers are tracked, data records 420 of their port history is kept. When a tanker visits a port, the illustrative embodiments allocate an activity to that port calling based on a combination of vessel, port and jetty characteristic data. For example, if a crude tanker were to visit Ras Tanura in Saudi Arabia, a crude export terminal, then the illustrative examples would assign this port calling a tag of 'Loading.'

Port facilities can be hierarchically organized at different granularities. In this illustrative example, port facilities is first example of hierarchies 232 of FIG. 2. For example, a coastal country may have many harbors, such as harbor 410. As used herein, a "harbor" is basically an area filled with water sheltered by natural barriers, such as land and rocks or artificial barriers like breakwaters. A harbor can provide a ship with safe anchorage and allow the transfer of goods and/or passengers between the ship and the shore.

Each harbor may have one or more ports, such as port 412, sometimes referred to herein as a "zone". As used herein, a "port" is a place within the harbor where a ship can dock for a commercial purpose of either handling cargo or passengers or taking care of the ship's requirements.

Each port may have one or more terminals 414, also sometimes referred to as an "pier" or "jetty." These Terminals are demarcated areas in a Port for handling different types of cargoes. Each terminal may additionally include one or more berths and/or quays where the ship is moored onto the bollards, and where the cargo is loaded or discharged on and off the ships.

Cargo Commodities can be hierarchically organized at different granularities. In this illustrative example, the hierarchical arrangement of commodities is second example of hierarchies 232 of FIG. 2. For example, commodities may be organized at various granularities, including dry, wet, and gas commodities.

Commodities can be a dry commodity. As used herein, the term "dry commodity" includes metallic ores, such as iron and copper, as well as carbonaceous solids, such as anthracite, bituminous coal, and lignite.

Commodities can be a wet commodity. As used herein, the term "wet commodity" includes crude oil, petroleum products, petrochemicals, and biofuels, as well as other liquid commodities.

Commodities can be gaseous. As used herein, the term "gaseous commodity" can be a liquefied petroleum gas (LPG)
  also sometimes referred to as a natural gas liquid (NGL) such as ethane, propane, butane, isobutane and natural gasoline/condensate. A "gaseous commodity" may also be a liquefied natural gas (LNG), such as methane, which has been converted to a liquid state by pressure and cooling.

Figure 5:
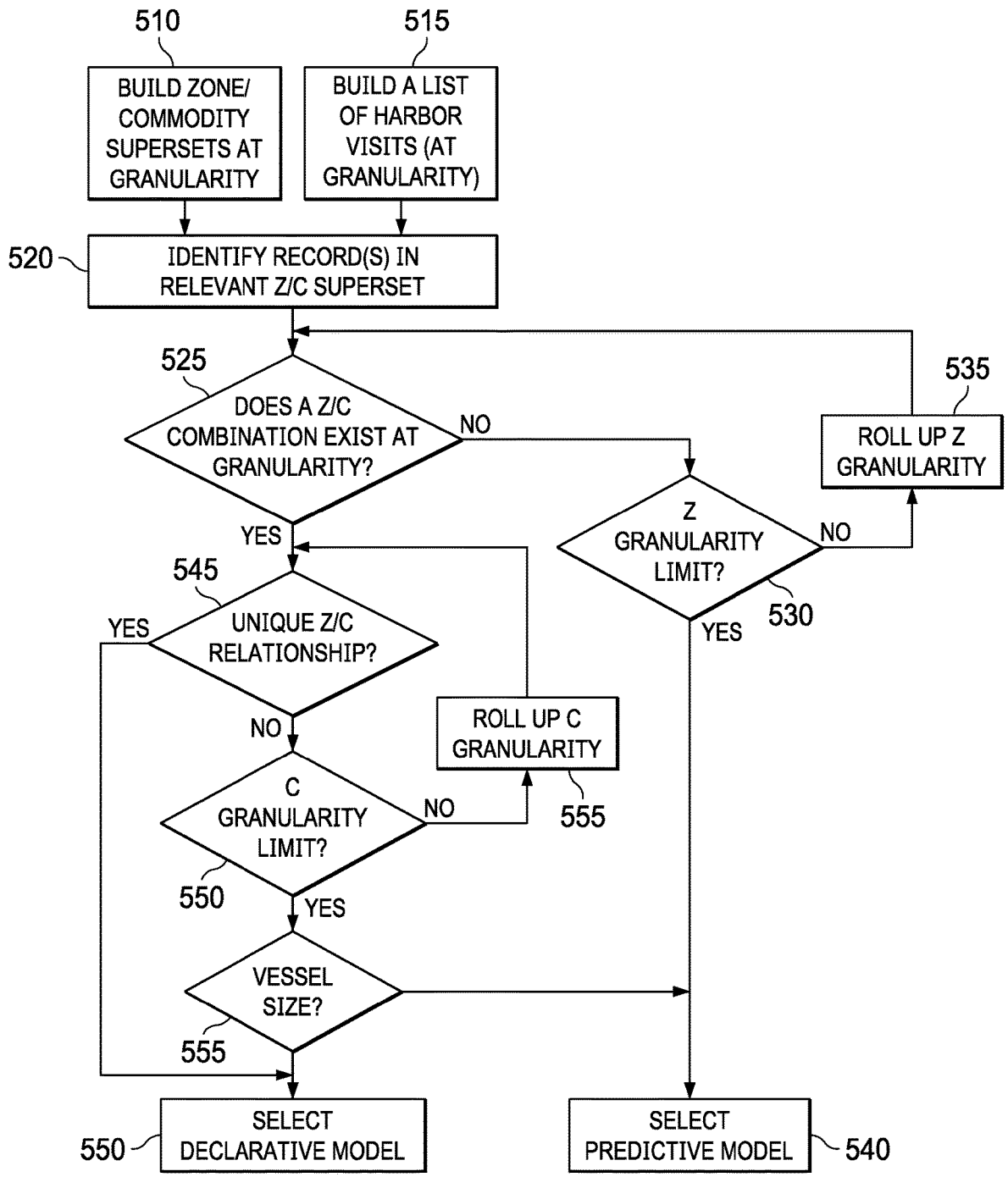
FIG. 5 is an algorithm for selecting a model for a particular use case of classifying shipping commodities depicted in accordance with an illustrative embodiment.

With reference next to FIG. 5, an algorithm for selecting a model for a particular use case of classifying shipping commodities is depicted in accordance with an illustrative embodiment.

Zone/commodity supersets are built for each across the different granularities of both the harbor and the commodities (510). A list of harbor visits is built for different vessels at granularity (515).

Records for a particular vessel are identified in the zone/commodity superset (520). The elements/commodity superset can initially be a zone/commodity superset having a lowest granularity for both harbor and commodities. The algorithm then determines whether data records for the zone/commodity combination exist records at the current granularities (525).

The algorithm first determines a harbor granularity for comparing the data records. If data records for the zone/commodity combination do not exist in the current virtual dataset ("no" at 525), and an upper limit of zone granularity (i.e., least granular) has not yet been reached ("no" at 530), the current virtual dataset is rolled up into to a virtual dataset at a higher zone granularity (535). Step 525-535 can be repeated iteratively until records are located for the vessel at a particular granularity, or until the upper limit of zone granularity is reached. If no data records are found for the zone/commodity combination at the zone granularity limit ("yes" at 530), the algorithm selects a predictive model (540) for determining the commodity contents of the vessel. The predictive model can be, for example, one of machine learning models 252 of FIG. 2.

The algorithm next determines a commodity granularity for comparing the data records. Upon identifying data records in a virtual dataset for the zone/commodity combination ("yes" at 525), the algorithm determines whether the identify data records are unique to a particular zone/commodity combination at the current granularities (545). If data records are unique to a zone/commodity combination at the current granularities, ("yes" at 545), the algorithm selects a declarative model (550) for determining the commodity contents of the vessel. The declarative model can be, for example, declarative models 234 of FIG. 2.

If data records are not unique to a zone/commodity combination at the current granularities, ("no" at 545), and an upper limit of commodity granularity (i.e., least granular) has not yet been reached ("no" at 550), the current virtual dataset is rolled up into to a virtual dataset at a higher commodity granularity (555). Step 545-555 can be repeated iteratively until the data records are unique to the particular zone/commodity combination, or until the commodity granularity is reached.

Upon reaching the commodity granularity limit ("yes" at 550), the algorithm selects a predictive model (540) for determining the commodity contents of the vessel. Optionally, the algorithm may optionally apply one or more additional rules, such as sorting data records according to a threshold vessel size (560), and selecting between declarative models and predictive models according to the outcome of additional rules.

The illustrations of FIGS. 4-5 are provided as one illustrative example of a use case for classifying data records pertaining to shipping cargoes and commodities and are not meant to limit the manner in which the classification of data records can be performed in other illustrative examples.

Figure 6:
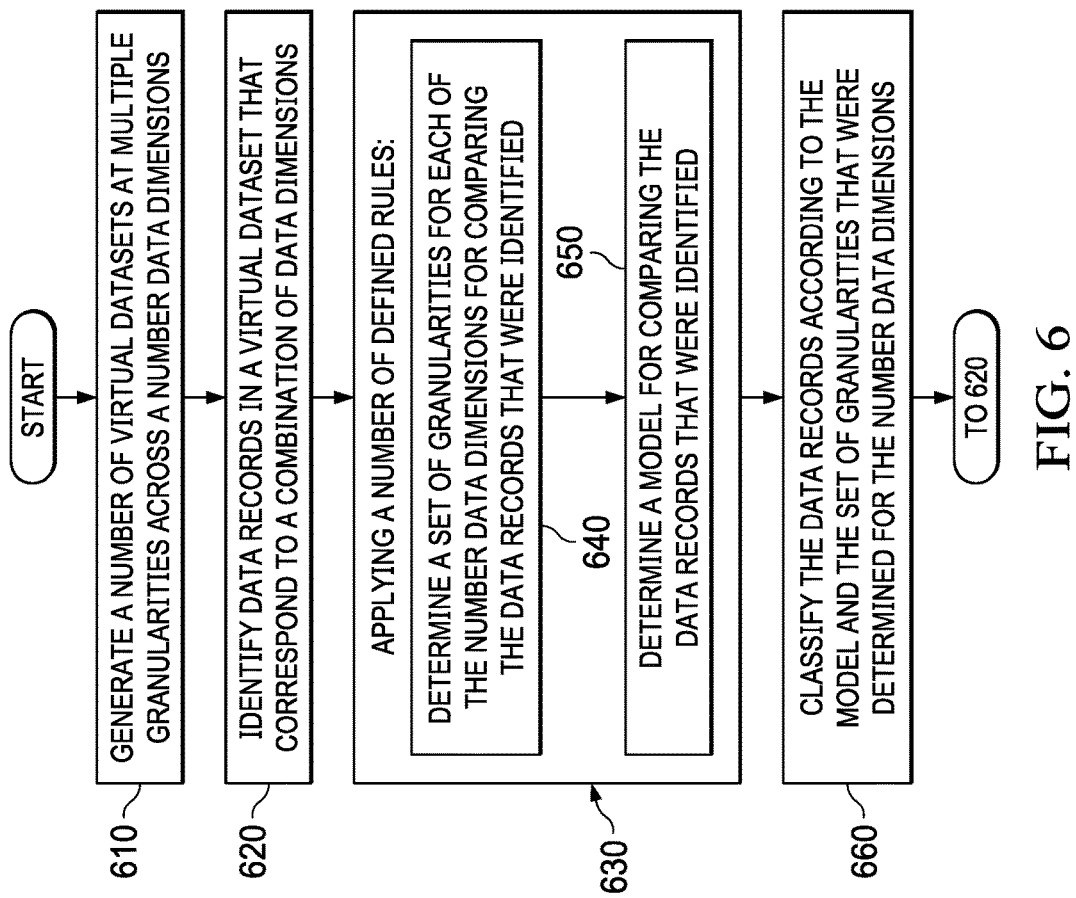
FIG. 6 is a flowchart of a process for classifying data records depicted in accordance with an illustrative embodiment.

Turning next to FIG. 6, a flowchart of a process for classifying data records is depicted in accordance with an illustrative embodiment. The process in FIG. 6 can be implemented in hardware, software, or both. When implemented in software, the process can take the form of program code that is run by one or more processor units located in one or more hardware devices in one or more computer systems. For example, the process can be implemented in classifier 206 in computer system 204 in FIG. 2.

The process begins by generating a number of virtual datasets at multiple granularities across a number of data dimensions (step 610). The process identifies data records in a virtual dataset that corresponds to a combination of data dimensions (step 620).

The process applies a number of defined rules (step 630). In this illustrative example, the rules include a rule for determining a set of granularities for each of the number data dimensions for comparing the data records that were identified (step 640), and a rule for determining a model for comparing the data records that were identified (step 650).

The process classifies the data records according to the model and the set of granularities that were determined for the number data dimensions (step 660). Thereafter, the process terminates.

Figure 7:
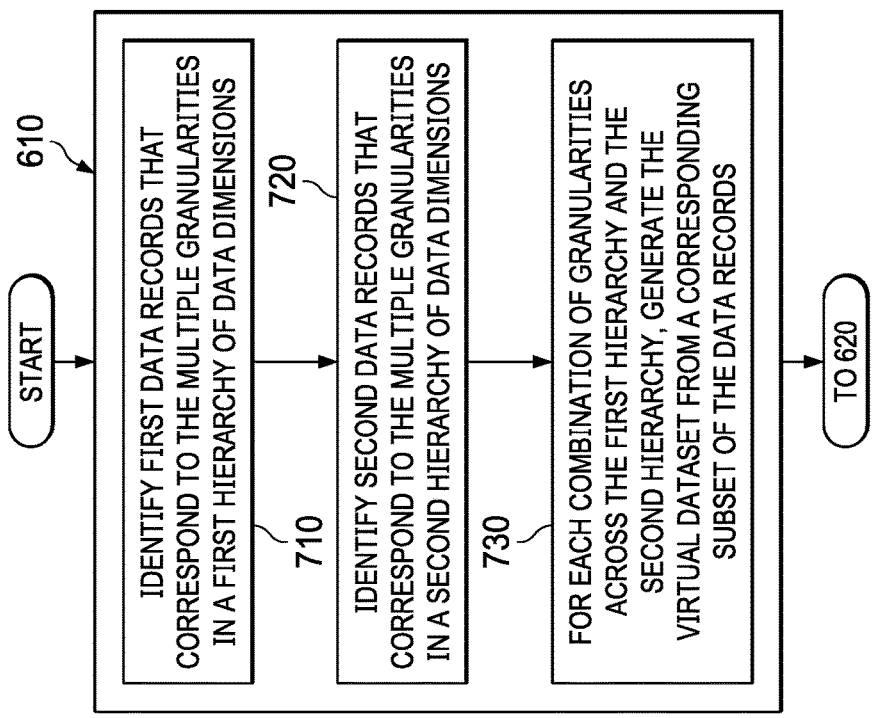
FIG. 7 is a flowchart of a process for generating a number of virtual datasets depicted in accordance with an illustrative embodiment.

With reference next to FIG. 7, a flowchart of a process for generating a number of virtual datasets is depicted in accordance with an illustrative embodiment. The process in FIG. 7 is an example one implementation for step 610 in FIG. 6.

The process identifies first data records that correspond to the multiple granularities in a first hierarchy of data dimensions (step 710). The process identifies second data records that correspond to the multiple granularities in a second hierarchy of data dimensions (step 720). For each combination of granularities across the first hierarchy and the second hierarchy, the process generates the virtual dataset from a corresponding subset of the data records (step 730). Thereafter, the process may continue to step 620 of FIG. 6.

Figure 8:
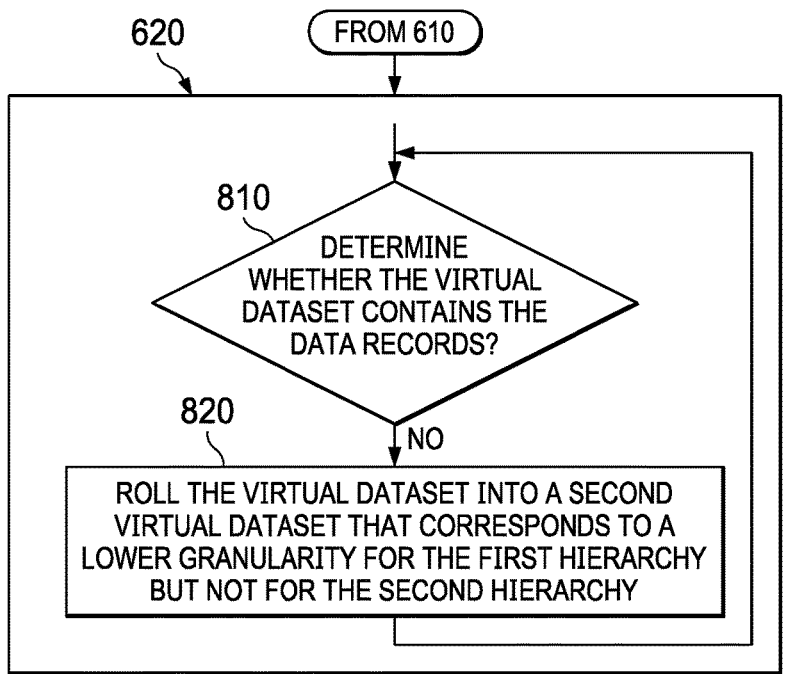
FIG. 8 is a flowchart of a process for identifying data records in a virtual dataset depicted in accordance with an illustrative embodiment.

With reference next to FIG. 8, a flowchart of a process for identifying data records in a virtual dataset is depicted in accordance with an illustrative embodiment. The process in FIG. 8 is an example one implementation for step 620 in FIG. 6.

The process determines whether the virtual dataset contains the data records (step 810). Responsive to determining that the virtual dataset does not contain the data records ("no" at 810), the process rolls the virtual dataset into a second virtual dataset that corresponds to a lower granularity for the first hierarchy but not for the second hierarchy (step 820). Steps 810-820 may continue iteratively until the data records are located, or until granularity limit is reached according to the first hierarchy.

Figure 9:
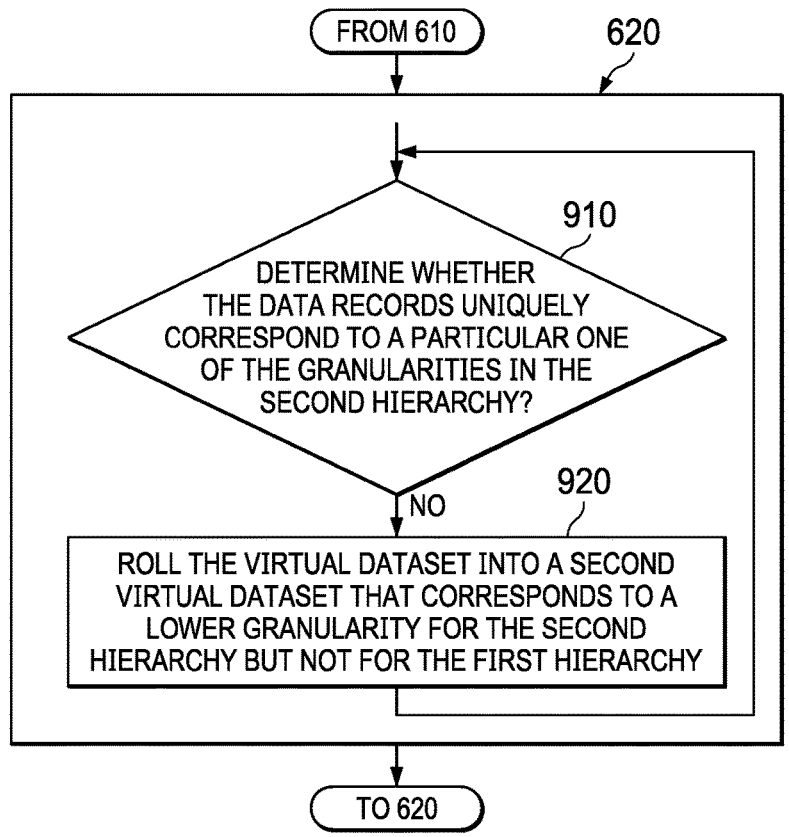
FIG. 9 is a flowchart of a process for identifying data records in a virtual dataset depicted in accordance with an illustrative embodiment.

With reference next to FIG. 9, a flowchart of a process for identifying data records in a virtual dataset is depicted in accordance with an illustrative embodiment. The process in FIG. 9 is an example one implementation for step 620 in FIG. 6.

The process determines whether the data records uniquely correspond to a particular one of the granularities in the second hierarchy (step 910). Responsive to determining that the virtual dataset does not uniquely correspond to the particular one ("no" at 910), the process rolls the virtual dataset into a second virtual dataset that corresponds to a lower granularity for the second hierarchy but not for the first hierarchy (step 920). Steps 910-920 may continue iteratively until the data records are located, or until granularity limit is reached according to the second hierarchy.

Figure 10:
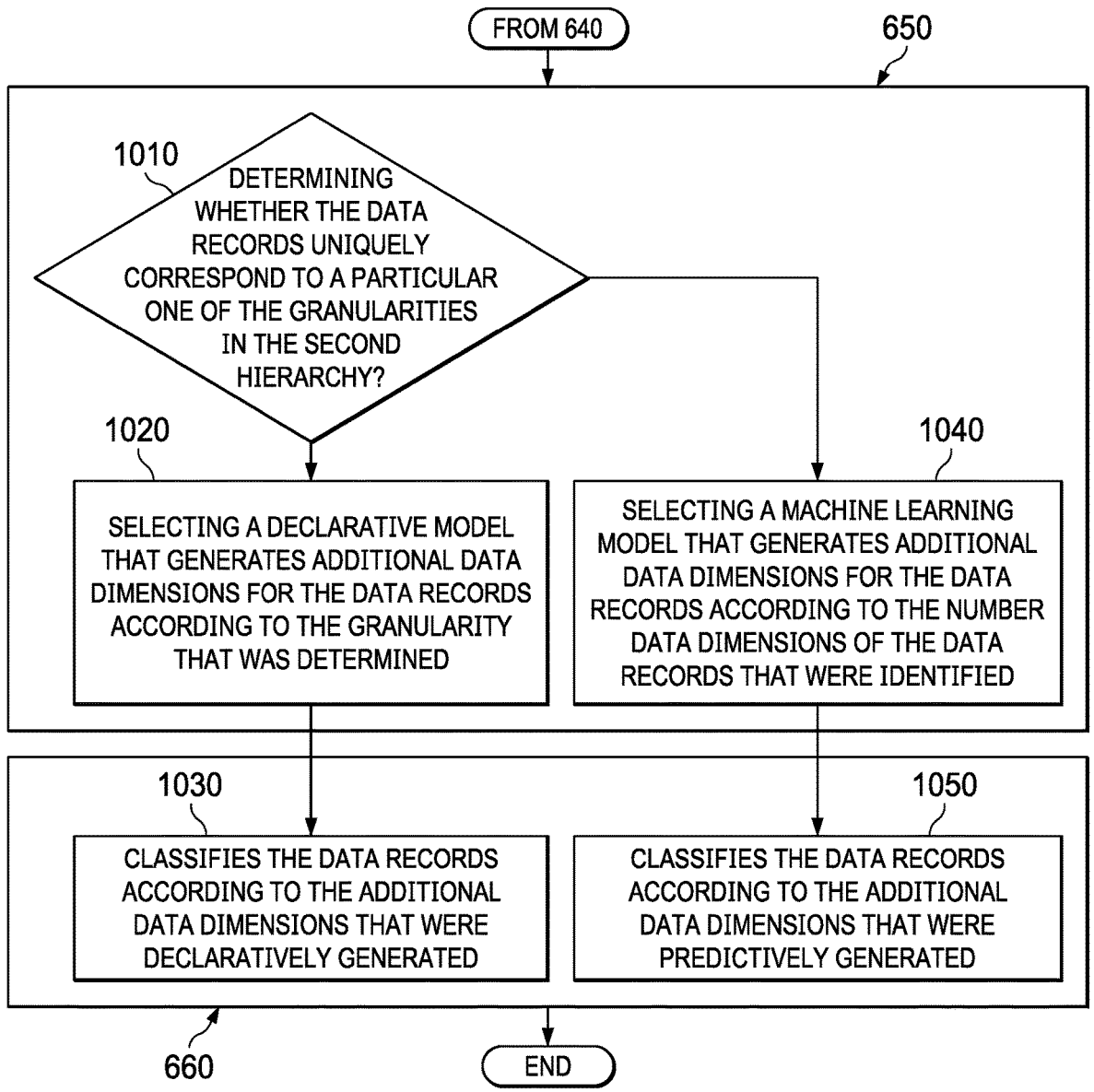
FIG. 10 is a flowchart of a process for determining a model for comparing data records depicted in accordance with an illustrative embodiment.

With reference next to FIG. 10, a flowchart of a process for determining a model for comparing data records is depicted in accordance with an illustrative embodiment. The process in FIG. 10 is an example one implementation for steps 650-660 in FIG. 6.

The process determines whether the data records uniquely correspond to a particular one of the granularities in the second hierarchy (step 1010). Responsive to determining that the virtual dataset uniquely corresponds to the particular one ("yes" at 1010), the process selects a declarative model that generates additional data dimensions for the data records according to the granularity that was determined (step 1020). The process classifies the data records according to the additional data dimensions that were declaratively generated (step 1030).

Returning now to step 1010, responsive to determining that the virtual dataset does not uniquely correspond to the particular one ("no" at 1010), the process selects a machine learning model that generates additional data dimensions for the data records according to the number data dimensions of the data records that were identified (step 1040). The process classifies the data records according to the additional data dimensions that were predictively generated (step 1050).

Figure 11:
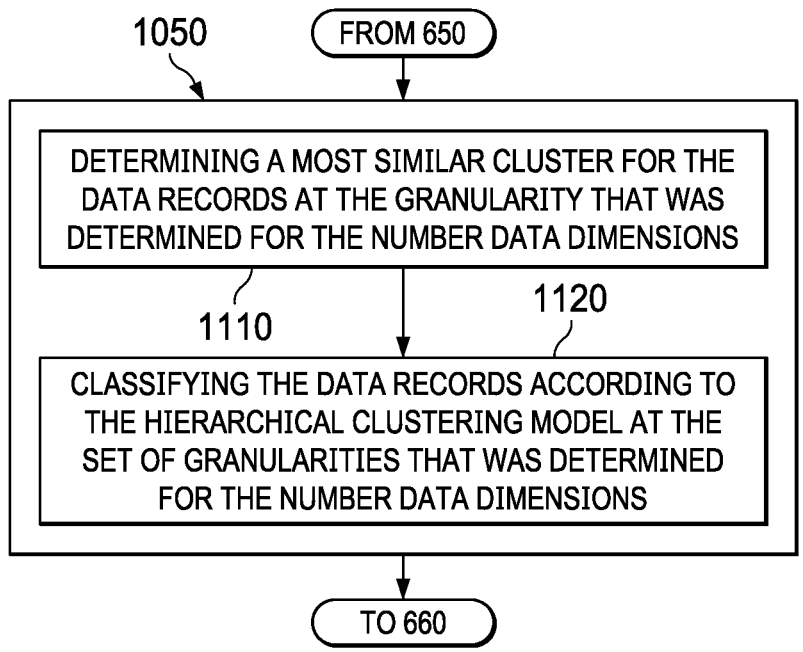
FIG. 11 is a flowchart of a process for classifying data records according to a probabilistic model depicted in accordance with an illustrative embodiment.

With reference next to FIG. 11, a flowchart of a process for classifying data records according to a probabilistic model is depicted in accordance with an illustrative embodiment. The process in FIG. 11 is an example one implementation for step 1050 in FIG. 10.

In this illustrative example, the probabilistic model is a hierarchical clustering model, such as hierarchical clustering models 236 of FIG. 2. The process determines a most similar cluster for the data records at the granularity that was determined for the number data dimensions (step 1110). The process classifies the data records according to the hierarchical clustering model at the set of granularities that was determined for the number data dimensions (step 1120).

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 12:
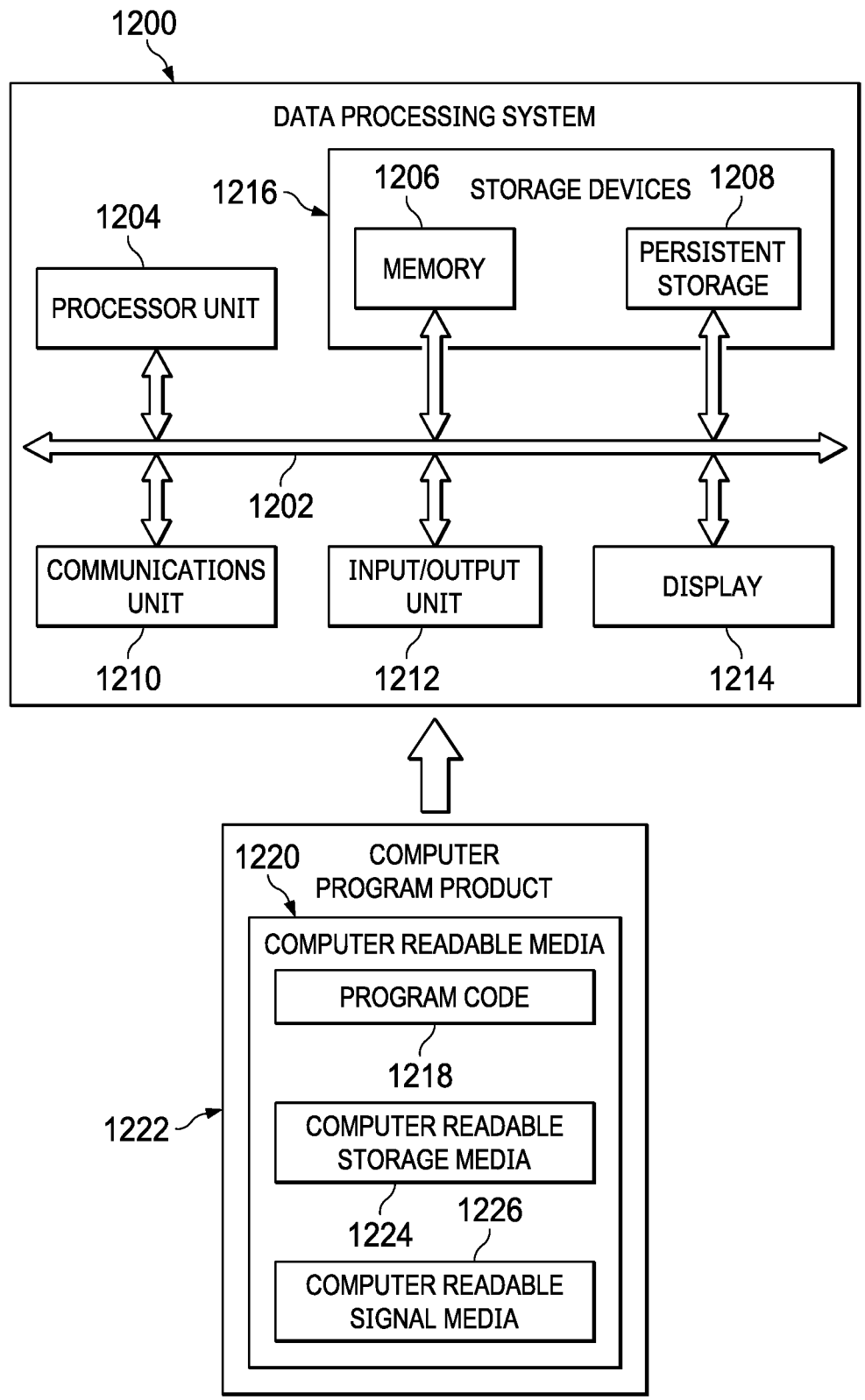
FIG. 12 is a block diagram of a data processing system in accordance with an illustrative embodiment.

Turning now to FIG. 12, a block diagram of a data processing system is depicted in accordance with an illustrative embodiment. Data processing system 1200 can be used to implement server computer 104, server computer 106, client devices 110, in FIG. 1. Data processing system 1200 can also be used to implement computer system 204 in FIG. 2. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 takes the form of a bus system.

Processor unit 1204 serves to execute instructions for software that can be loaded into memory 1206. Processor unit 1204 includes one or more processors. For example, processor unit 1204 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1204 can may be implemented using one or more heterogeneous processor systems in which a main processor is present with secondary processors on a single chip. As another illustrative example, processor unit 1204 can be a symmetric multi-processor system containing multiple processors of the same type on a single chip.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, can be, for example, a random-access memory or any other suitable volatile or non-volatile storage device. Persistent storage 1208 may take various forms, depending on the particular implementation.

For example, persistent storage 1208 may contain one or more components or devices. For example, persistent storage 1208 can be a hard drive, a solid-state drive (SSD), a flash memory, a rewritable optical disk, a rewritable magnetic tape, or some combination of the above. The media used by persistent storage 1208 also can be removable. For example, a removable hard drive can be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that can be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs can be located in storage devices 1216, which are in communication with processor unit 1204 through communications framework 1202. The processes of the different embodiments can be performed by processor unit 1204 using computer-implemented instructions, which may be located in a memory, such as memory 1206.

These instructions are program instructions and are also referred to as program code, computer usable program code, or computer-readable program code that can be read and executed by a processor in processor unit 1204. The program code in the different embodiments can be embodied on different physical or computer-readable storage media, such as memory 1206 or persistent storage 1208.

Program code 1218 is located in a functional form on computer-readable media 1220 that is selectively removable and can be loaded onto or transferred to data processing system 1200 for execution by processor unit 1204. Program code 1218 and computer-readable media 1220 form computer program product 1222 in these illustrative examples. In the illustrative example, computer-readable media 1220 is computer-readable storage media 1224.

In these illustrative examples, computer-readable storage media 1224 is a physical or tangible storage device used to store program code 1218 rather than a medium that propagates or transmits program code 1218. Computer-readable storage media 1224, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. The term "non-transitory" or "tangible," as used herein, is a limitation of the medium itself (i.e., tangible, not a signal) as opposed to a limitation on data storage persistency (e.g., RAM vs. ROM).

Alternatively, program code 1218 can be transferred to data processing system 1200 using a computer-readable signal media. The computer-readable signal media are signals and can be, for example, a propagated data signal containing program code 1218. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media" can be singular or plural. For example, program code 1218 can be located in computer-readable media 1220 in the form of a single storage device or system. In another example, program code 1218 can be located in computer-readable media 1220 that is distributed in multiple data processing systems. In other words, some instructions in program code 1218 can be located in one data processing system while other instructions in program code 1218 can be located in one data processing system. For example, a portion of program code 1218 can be located in computer-readable media 1220 in a server computer while another portion of program code 1218 can be located in computer-readable media 1220 located in a set of client computers.

The different components illustrated for data processing system 1200 are not meant to provide architectural limitations to the manner in which different embodiments can be implemented. In some illustrative examples, one or more of the components may be incorporated in or otherwise form a portion of, another component. For example, memory 1206, or portions thereof, may be incorporated in processor unit 1204 in some illustrative examples. The different illustrative embodiments can be implemented in a data processing system including components in addition to or in place of those illustrated for data processing system 1200. Other components shown in FIG. 12 can be varied from the illustrative examples shown. The different embodiments can be implemented using any hardware device or system capable of running program code 1218.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for classifying data records, the method comprising:
   generating, by a number of processor units, a number of virtual datasets at multiple granularities across a number of data dimensions, wherein the number of virtual datasets are generated by performing a series of data transformations on a set of data records;
   identifying, by the number of processor units, a number of data records in the set of data records using a virtual dataset that corresponds to a combination of data dimensions from the number of data dimensions;
   determining, by the number of processor units, a set of granularities for each of the combination of data dimensions for comparing the number of data records that were identified; and
   determining, by the number of processor units, a machine learning model to classify the number of data records based on probabilistic relationships among the combination of data dimensions; and
   classifying, by the number of processor units, the number of data records using the machine learning model and the set of granularities that were determined for the combination of data dimensions.

2. The method of claim 1, wherein generating the number of virtual datasets further comprises:
   identifying, by the number of processor units using the machine learning model, first data records that correspond to the multiple granularities in a first hierarchy of data dimensions;
   identifying, by the number of processor units using the machine learning model, second data records that correspond to the multiple granularities in a second hierarchy of data dimensions; and
   for each combination of granularities across the first hierarchy and the second hierarchy, generating, by the number of processor units, the virtual dataset from a corresponding subset of the number of data records.

3. The method of claim 2, wherein identifying the number of data records using the virtual dataset further comprises:
determining, by the number of processor units, whether the virtual dataset contains the number of data records; and
responsive to determining that the virtual dataset does not contain the number of data records, rolling, by the number of processor units, the virtual dataset into a second virtual dataset that corresponds to a lower granularity for the first hierarchy but not for the second hierarchy.

4. The method of claim 2, wherein identifying the number of data records using the virtual dataset further comprises:
determining, by the number of processor units, whether the number of data records uniquely correspond to a particular one of the granularities in the second hierarchy; and
responsive to determining that the virtual dataset does not uniquely correspond to the particular one, by the number of processor units, the virtual dataset into a second virtual dataset that corresponds to a lower granularity for the second hierarchy but not for the first hierarchy.

5. The method of claim 2, wherein determining, by the number of processor units, a machine learning model to classify the number of data records based on probabilistic relationships among the combination of data dimensions further comprises:
determining, by the number of processor units, whether the number of data records uniquely correspond to a particular one of the granularities in the second hierarchy; and
responsive to determining that the virtual dataset uniquely corresponds to the particular one, selecting, by the number of processor units, a declarative model from the machine learning model that generates additional data dimensions for the number of data records according to the granularity that was determined and classifies the number of data records according to the additional data dimensions that were declaratively generated.

6. The method of claim 5, wherein the machine learning model is a hierarchical clustering model that is trained from a training dataset of data records, the method further comprising:
determining a most similar cluster for the number of data records at the granularity that was determined for the number of data dimensions; and
classifying the number of data records according to the hierarchical clustering model at the set of granularities that was determined for the number of data dimensions.

7. A computer system comprising:
a hardware processor; and
a classifier, in communication with a number of processor units, wherein the classifier is configured to execute program code for:
generating a number of virtual datasets at multiple granularities across a number of data dimensions, wherein the number of virtual datasets are generated by performing a series of data transformations on a set of data records;
identifying data records in the set of data records using a virtual dataset that corresponds to a combination of data dimensions from the number of data dimensions;
determining a set of granularities for each of the combination of data dimensions for comparing the number of data records that were identified; and
determining a machine learning model to classify the number of data records based on probabilistic relationships among the combination of data dimensions; and
classifying the number of data records using the machine learning model and the set of granularities that were determined for the combination of data dimensions.

8. The computer system of claim 7, wherein generating the number of virtual datasets further comprises:
identifying first data records that correspond to the multiple granularities in a first hierarchy of data dimensions;
identifying second data records that correspond to the multiple granularities in a second hierarchy of data dimensions; and
for each combination of granularities across the first hierarchy and the second hierarchy, generating the virtual dataset from a corresponding subset of the number of data records.

9. The computer system of claim 7, wherein identifying the number of data records using the virtual dataset further comprises:
determining whether the virtual dataset contains the number of data records; and
responsive to determining that the virtual dataset does not contain the number of data records, rolling the virtual dataset into a second virtual dataset that corresponds to a lower granularity for the first hierarchy but not for the second hierarchy.

10. The computer system of claim 7, wherein identifying the data records using the virtual dataset further comprises:
determining whether the number of data records uniquely correspond to a particular one of the granularities in the second hierarchy; and
responsive to determining that the virtual dataset does not uniquely correspond to the particular one, rolling the virtual dataset into a second virtual dataset that corresponds to a lower granularity for the second hierarchy but not for the first hierarchy.

11. The computer system of claim 7, wherein determining the model for comparing the number of data records further comprises:
determining whether the data records uniquely correspond to a particular one of the granularities in the second hierarchy; and
responsive to determining that the virtual dataset uniquely corresponds to the particular one, selecting a declarative model from the machine learning model that generates additional data dimensions for the data records according to the granularity that was determined and classifies the data records according to the additional data dimensions that were declaratively generated.

12. The computer system of claim 11, wherein the machine learning model is a hierarchical clustering model that is trained from a training dataset of data records, the method further comprising:
determining a most similar cluster for the data records at the granularity that was determined for the number of data dimensions; and
classifying the data records according to the hierarchical clustering model at the set of granularities that was determined for the number of data dimensions.

13. A computer program product comprising:
a computer readable storage media; and
program code, stored on the computer readable storage media, for classifying data records, and when executed, instruct a computer system to perform a method of:
  generating a number of virtual datasets at multiple granularities across a number of data dimensions, wherein the number of virtual datasets are generated by performing a series of data transformations on a set of data records;
  identifying data records in the set of data records using a virtual dataset that corresponds to a combination of data dimensions from the number of data dimensions;
  determining a set of granularities for each of the number of data dimensions for comparing the number of data records that were identified; and
  determining a machine learning model to classify the number of data records based on probabilistic relationships among the combination of data dimensions; and
  classifying the number of data records according to the machine learning model and the set of granularities that were determined for the combination of data dimensions.

14. The computer program product of claim 13, wherein generating the number of virtual datasets further comprises:
  identifying first data records that correspond to the multiple granularities in a first hierarchy of data dimensions;
  identifying second data records that correspond to the multiple granularities in a second hierarchy of data dimensions; and
  for each combination of granularities across the first hierarchy and the second hierarchy, generating the virtual dataset from a corresponding subset of the number of data records.

15. The computer program product of claim 14, wherein identifying the number of data records using the virtual dataset further comprises:
  determining whether the virtual dataset contains the number of data records; and
  responsive to determining that the virtual dataset does not contain the number of data records, rolling the virtual dataset into a second virtual dataset that corresponds to a lower granularity for the first hierarchy but not for the second hierarchy.

16. The computer program product of claim 14, wherein identifying the number of data records using the virtual dataset further comprises:
  determining whether the number of data records uniquely correspond to a particular one of the granularities in the second hierarchy; and
  responsive to determining that the virtual dataset does not uniquely correspond to the particular one, rolling the virtual dataset into a second virtual dataset that corresponds to a lower granularity for the second hierarchy but not for the first hierarchy.

17. The computer program product of claim 14, wherein determining a machine learning model to classify the number of data records based on probabilistic relationships among the combination of data dimensions:
  determining whether the number of data records uniquely correspond to a particular one of the granularities in the second hierarchy; and
  responsive to determining that the virtual dataset uniquely corresponds to the particular one, selecting a declarative model from the machine learning model that generates additional data dimensions for the number of data records according to the granularity that was determined and classifies the number of data records according to the additional data dimensions that were declaratively generated.

18. The computer program product of claim 17, wherein the machine learning model is a hierarchical clustering model that is trained from a training dataset of number of data records, the method further comprising:
  determining a most similar cluster for the number of data records at the granularity that was determined for the number of data dimensions; and
  classifying the number of data records according to the hierarchical clustering model at the set of granularities that was determined for the number of data dimensions.

19. The method of claim 1, wherein the series of data transformation is performed in a layered stack manner that each data transformation is built on the output of previous data transformation in the series of data transformation.

20. The computer system of claim 7, wherein the series of data transformation is performed in a layered stack manner that each data transformation is built on the output of previous data transformation the series of data transformation.

21. The computer program product of claim 13, wherein the series of data transformation is performed in a layered stack manner that each data transformation is built on the output of previous data transformation the series of data transformation.

* * * * *